United States Patent [19]
Kobayashi

[11] Patent Number: 5,974,477
[45] Date of Patent: Oct. 26, 1999

[54] IMAGE FORMING APPARATUS CAPABLE OF RECEIVING DATA IN HIGH SPEED IN ACCORDANCE WITH HIGH SPEED DATA TRANSMISSION INTERFACE

[75] Inventor: Hiroki Kobayashi, Kanagawa, Japan

[73] Assignee: Ricoh Company, Ltd., Tokyo, Japan

[21] Appl. No.: 08/886,050

[22] Filed: Jun. 30, 1997

[30] Foreign Application Priority Data

Jun. 28, 1996 [JP] Japan ................................. 8-188553

[51] Int. Cl.$^6$ ...................................................... G06F 13/00
[52] U.S. Cl. ............................................... 710/22; 710/18
[58] Field of Search ........................... 395/821, 842–849, 395/873; 710/15–19, 22–35

[56] References Cited

U.S. PATENT DOCUMENTS

| | | | |
|---|---|---|---|
| 4,181,938 | 1/1980 | Suzuki et al. ............................ | 710/23 |
| 5,375,218 | 12/1994 | Umeda .................................... | 395/842 |
| 5,497,501 | 3/1996 | Kohzono et al. ........................ | 710/29 |
| 5,539,917 | 7/1996 | Jirgal ....................................... | 395/842 |
| 5,651,114 | 7/1997 | Davidson, Jr. ..................... | 395/200.59 |
| 5,678,062 | 10/1997 | Okada et al. ........................... | 395/842 |
| 5,710,939 | 1/1998 | Ballachino et al. .................... | 395/821 |
| 5,778,198 | 7/1998 | Kadota .................................... | 395/286 |
| 5,819,111 | 10/1998 | Davies et al. .......................... | 395/849 |
| 5,828,903 | 10/1998 | Sethuram et al. ...................... | 395/873 |
| 5,896,550 | 4/1999 | Wehunt et al. ......................... | 710/26 |

*Primary Examiner*—Christopher B. Shin
*Attorney, Agent, or Firm*—Oblon, Spivak, McClelland, Maier & Neustadt, P.C.

[57] ABSTRACT

An image forming apparatus capable of receiving data in high speed in accordance with high speed data transmission interface. The invention includes, a DMA transmission device, a bi-directional communication device, a flag indicator for indicating a status of the receiving parallel data from a host system according to DMA transmission is executed or not by the DMA transmission device a control device controls executing of the bi-directional communication by the bi-directional communication device that when the flag indicator indicates the receiving parallel data from a host system according to DMA transmission is executed, a signal of availability of bi-directional communication is sent to the host system after the receiving parallel data from a host system according to DMA transmission is suspended. When said flag means indicates said receiving parallel data from the host system according to DMA transmission is not executed, a signal of availability of bi-directional communication is sent to the host system immediately.

6 Claims, 5 Drawing Sheets

| PIN NUMBER | SIGNAL NAME OF CENTRONICS | SIGNAL SOURCE | PAIR RETURN PIN NUMBER | SIGNAL NAME OF IEEE 1284 | REMARKS |
|---|---|---|---|---|---|
| 1 | $\overline{\text{DATA} \cdot \text{STB}}$ | H | 19 | $\overline{\text{STROBE}}$ | STROBE OF READING DATA FROM HOST |
| 2 ⟩ 9 | DATA 1 ⟩ DATA 8 | H | 20 ⟩ 27 | DATA 1 ⟩ DATA 8 | DATA FROM HOST |
| 10 | $\overline{\text{ACK}}$ | P | 28 | $\overline{\text{Ack}}$ | INDICATE POSSIBLE DATA TRANSMISSION |
| 11 | BUSY | P | 29 | Busy | IEEE 1284 PRINTER SENDS DATA 3 & DATA 7 |
| 12 | PE | P | 30 (28) | PError | IEEE 1284 PRINTER SENDS DATA 2 & DATA 6 |
| 13 | SELECT | P | (28) | Select | IEEE 1284 PRINTER SENDS DATA 1 & DATA 5 |
| 14 | | | (30) | $\overline{\text{Auto Fd}}$ | "LOW" INDICATES POSSIBLE RECEIVING DATA |
| 15 | | | | N.D. | |

CONTINUED FROM FIG. 2A

| | | | | | |
|---|---|---|---|---|---|
| 16 | SIGNAL Gnd | | | Logic Gnd | |
| 17 | Frame Gnd | | | Chasis Gnd | |
| 18 | +5V | P | | Peripheral Logic High | |
| 19 ⟩ 30 | Signal Gnd | | | Signal Gnd | |
| 31 | | | 30 | $\overline{\text{Init}}$ | |
| 32 | | | (29) | $\overline{\text{Data Avail}}$ | "LOW" INDICATES EXISTENCE DATA 0 & DATA 4 ARE SENT |
| 33 ⟩ 35 | | | | N.D. | |
| 36 | $\overline{\text{SLCT IN}}$ | H | (30) | IEEE 1284 Active | CENTRONICS PRINTER SELECT SIGNAL IEEE 1284 "HIGH" INDICATE SET IEEE 1284 |

*FIG. 2B*

IMAGE FORMING APPARATUS CAPABLE OF RECEIVING DATA IN HIGH SPEED IN ACCORDANCE WITH HIGH SPEED DATA TRANSMISSION INTERFACE

BACKGROUND OF THE INVENTION

1. Field of the Invention

This invention relates to an image forming apparatus such as a laser beam printer, and more particularly to an image forming apparatus such a laser beam printer which is capable of receiving data in a relatively high speed in accordance with a data transmission speed provided from a host system to the laser beam printer through an interface operative in a high speed data transmission mode using parallel port interface with DMA (direct memory access) function.

2. Discussion of the Background

There has been an image apparatus capable of receiving data with DMA function which is transmission without controlling of an interface. The DMA function is the function of transmission data from a designated address to a destination address without controlling by a CPU. In this DMA function, when a parallel port is source and a receiving buffer is destination, a high speed receiving of parallel data can be executed.

On the other hand, there has been standardized a new parallel port interface operative for data transmission between a host system and an image forming apparatus such as a laser beam printer, recently by IEEE (Institute of Electrical and Electronics Engineers). This interface is called IEEE-1284 and includes bi-directional communication mode. In this interface, for request bi-directional communication mode, one byte data as expansion code is sent from a host system to an image forming apparatus for acknowledge setting bi-directional communication mode at a phase of negotiation.

In this system, during DMA transmission, when a bi-directional communication mode is requested, not only transmitted data but also the expansion code is taken into the receiving buffer, as a result, the bi-directional communication mode can not be executed and errors of data transmission are occurred. The reason of these errors of data transmission is that the expansion code data which should not be taken into the receiving buffer is transmitted to the receiving buffer because the DMA transmission is executed without controlling by a CPU. Therefore, a high speed parallel transmission by the DMA function and a bidirectional communication mode by software controlling can not coexist.

SUMMARY OF THE INVENTION

Accordingly, an object of the present invention is to provide a novel image forming apparatus which obviates the above-mention problem.

Another object of the present invention is to provide a novel image forming apparatus which is capable of processing for request of a bi-directional communication from a host system during receiving data according DMA transmission.

To achieve the above-mentioned objects, there is provide an image forming apparatus which includes a DMA transmission means, a bi-directional communication means, a flag means for indicating a status of the receiving parallel data from a host system according to DMA transmission is executed or not by the DMA transmission means, a control means, this control means controls executing of the bi-directional communication by the bi-directional communication means that when the flag means indicates said receiving parallel data from a host system according to DMA transmission is executed, a signal of availability of bi-directional communication is sent to said host system after said receiving parallel data from a host system according to DMA transmission is suspended, when said flag means indicates said receiving parallel data from a host system according to DMA transmission is not executed, a signal of availability of bidirectional communication is sent to said host system immediately.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a table of sample of a Centronics pins placement according to present invention;

DESCRIPTION OF THE PREFERRED EMBODIMENTS

Figure 1:
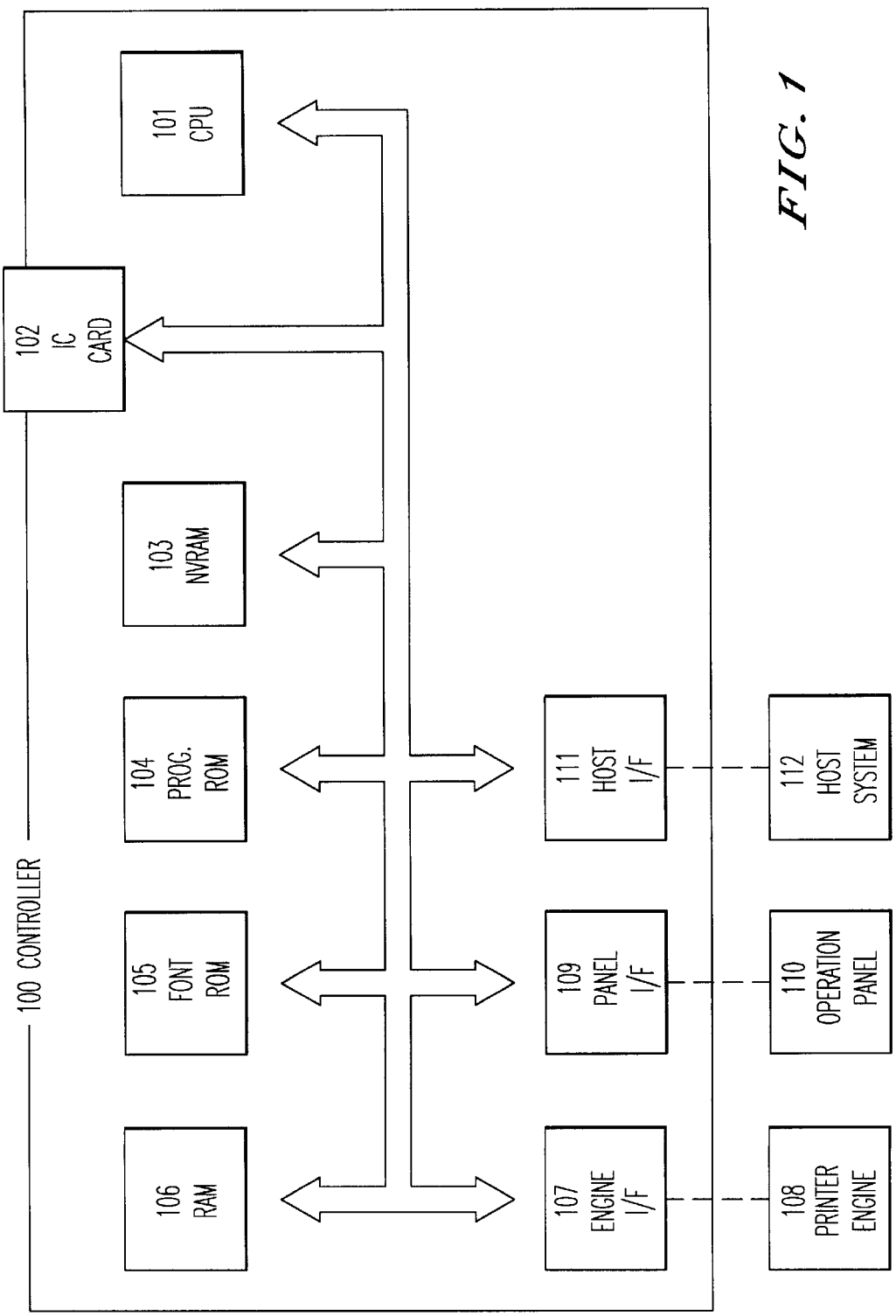
FIG. 1 is a block diagram of a printer according to present invention.

Referring now to the drawings, wherein like reference numerals designate identical or corresponding parts throughout the several views. A printer according to the embodiment of present invention has communication functions according to a DAM controller and an IEEE-1284. The case of the communication function according to a DMA controller, CPU defines an initial address, a kind of cycle and size of transmission data for the DMA controller, and the DMA controller makes a source address and destination address, and executes data transmission according to a cycle of reading source and writing destination.

In communication functions according to the IEEE-1284, there are a nimble mode and a byte mode. In the nimble mode, data are transmitted from a host system to a printer in steps of four bits by four status lines of Centronic interface. In the byte mode, data are transmitted from a host system to a printer by PS/2 parallel port which can execute bi-directional communication. This embodiment of present invention uses the nimble mode.

In this invention, during high speed communication with DMA, when a bi-directional mode is requested by host system, high speed communication with DMA is suspend and an interrupt process is executed. By these processes, this invention achieves the printer which can execute a high speed communication and bi-directional communication.

FIG. 1 is a block diagram of a printer according to present invention. This printer forms an image according to data from a host system 112. In FIG. 1, a printer controller 100 is connected a printer engine 108, an operation panel 110 and a host system 112. In the printer controller 100, each block, a CPU 101, an IC card 102, a NVRAM 103, a program ROM 104, a font ROM 105, a RAM 106, engine I/F 109 and a host I/F 111 is connected by an address data bus.

The CPU 101 controls the printer controller 100 as a whole according to a program stored in the program ROM 104, a selected mode information from the operation panel 110 and commands from the host system 112. The IC card 102 provides data, for example font data and program data to the printer controller 100. The NVRAM 103 includes a nonvolatile RAM and stores information, for example a mode information from the operation panel 110. The program ROM 104 stores a control program for controlling the printer controller 100. The font ROM 105 stores font pattern data.

The RAM 106 includes RAM as work memory for the CPU 101, an input buffer for inputted data, a page buffer for print data and memory for downloaded font data. The engine interface 107 is interface for communication between the printer controller 100 and the printer engine 108. In this engine interface 107, commands, status data and print data are sent and received. The printer engine 108 forms an image. The panel interface 109 is interface between the printer controller 100 and the operation panel 110. The operation panel 110 indicates a status of the printer to an operator. And an operator can input information, for example a mode information by this operation panel 110.

The host interface 111 is an interface between the printer controller 100 and the host system 112. Generally, this host interface is Centronics interface and RS232C interface. The host system 112 sends data and commands to the printer controller 100. By IEEE-1284, when the host system 112 requests the bi-directional communication mode, the host system 112 executes a prescribed process.

FIG. 2 is a table of sample of a Centronics pins placement. In FIG. 2, "PIN NUMBER" means a number of pins in the case of thirty-six pins connector. "SIGNAL NAME OF CENTRONICS" means a signal name in the case of Centronics. In "SIGNAL SOURCE", "H" means a signal form a host system to a printer, "P" means a signal from a printer to a host system. "PAIR RETURN PIN NUMBER" means pair return pin numbers which are signal ground. There are pin number 19–30 as pair return pin numbers. Pair return pin numbers inside the parentheses means pin numbers which are selected in the case of IEEE-1284, on the other hand, pin numbers without parentheses means which are selected both IEEE-1284 and Centronics. "SIGNAL NAME OF IEEE-1284" means signal names in the case of IEEE-1284 nimble mode. In "SIGNAL NAME OF IEEE-1284", "ND" means not determination of use. Data transmission from a printer to a host system is executed using pins of "ACK10", "BUSY11", "PE12", "SELECT13" and "FLAT32".

Figure 3:
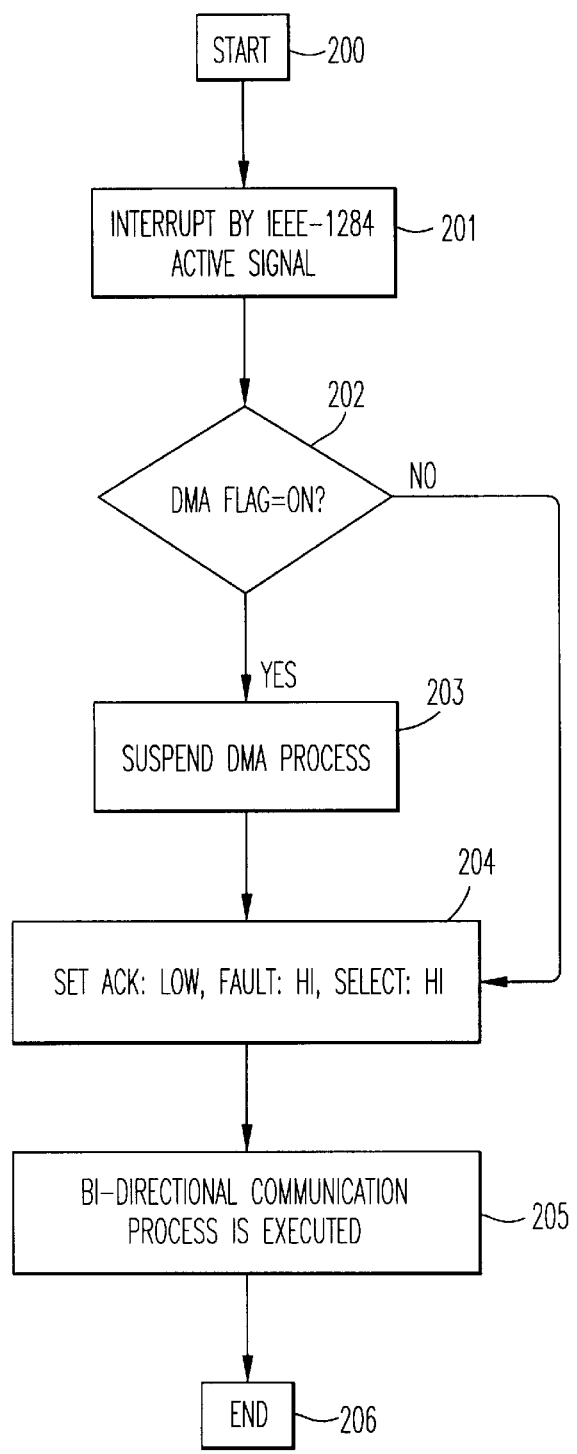
FIG. 3 is a flowchart of process of the printer according to present invention.

FIG. 3 is a flowchart of process of the printer according to present invention. For starting a communication by IEEE-1284, the host system 112 sets IEEE-1284 active signal "high" and interruption is caused to the printer controller 100 (step 201). At step 202, when the printer controller 100 receives this interruption, the printer controller 100 judges a status of a DMA flag. When the DMA flag is "ON", at step 203, a DMA process is suspended and process goes to step 204. When the DAM flag is "OFF", a process goes to step 204.

At step 204, the printer controller 100 sets ACK signal "Low", FAULT signal "Hi" and SELECT signal "Hi". The host system 112 sets STB signal "Low", and sends the expansion code data by data bus and selects the bi-directional communication mode. The bi-directional communication is executed according to the standard of IEEE-1284.

According to these process, the printer in this invention has the flag of status of high speed parallel communication by DMA, and when the high speed parallel communication by DMA starts, this flag is set "ON", and when the high speed parallel communication by DMA is finished, this flag is set "OFF". When the interruption by the IEEE-1284 active signal from the host system 112, the printer controller 100 makes a check this flag which indicates the high speed parallel communication by DMA is executed or not. If the flag is "ON" which means the high speed parallel communication by DMA is being executed, the high speed parallel communication by DMA is suspended and changed to receiving process by interruption. And the printer controller 100 sets ACK signal "Low", FAULT signal "Hi" and SELECT signal "Hi", and acknowledges availability of receiving the expansion code data. After that, the bi-directional communication according to the standard of IEEE-1284 is executed. After finishing this bi-directional communication according to the standard of IEEE-1284, the high speed parallel communication by DMA is resumed.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuit or by interconnecting an appropriate network of conventional components, as will be readily apparent to those skilled in the art.

Figure 4A:
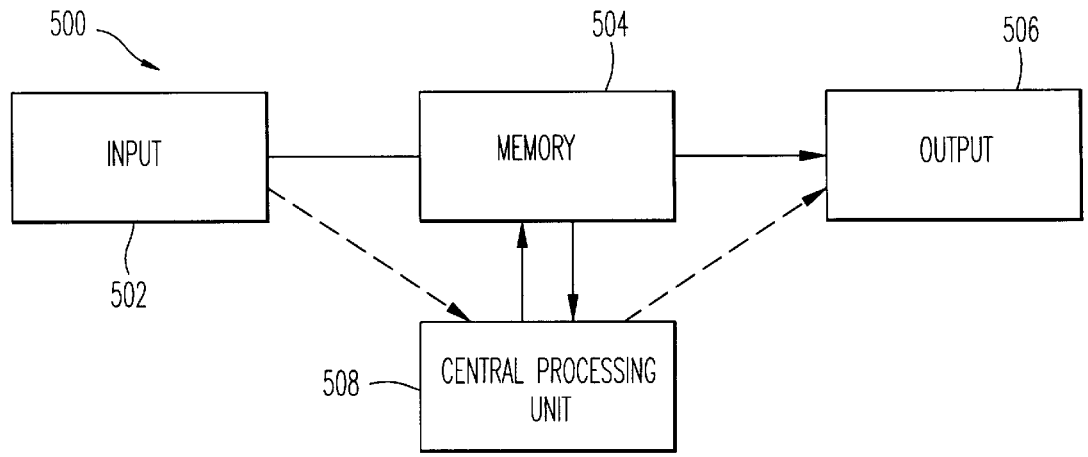
FIG. 4a illustrates an exemplary portion of a generalized computer system upon which portions of the invention may be implemented.

FIG. 4a illustrates an exemplary portion of a generalized computer system 500 upon which portions of the invention may be implemented. For example, the configurations illustrated in FIGS. 1–3 may each be implemented by a plurality of computers having a generalized configuration as exemplified by FIG. 4a or by a plurality of computers having configurations similar to those of FIGS. 4a and 4b described below.

An input 502 of FIG. 4a communicates with a memory 504 and a Central Processing Unit 508. The Central Processing Unit 508 communicates with the memory 504 and an output 506. The output 506 is also in communication with the memory 504. The Central Processing Unit 508 may include an arithmetic/logic unit and a control unit in the form of hardware and/or software (not shown). One or more of inputs 502 may each be in communication with one or more memories 504 and/or Central Processing Units 508. One or more Central Processing Units 508 may be in communication with one or more outputs 506 and/or memories 504 and/or inputs 502. One or more memories 504 may be in communication with one or more inputs 502 and/or Central Processing Units 508 and/or outputs 506. Clearly, a plurality of variations of computer hardware configurations may be realized in a network of computer systems upon which portions of the invention may be implemented.

Figure 4B:
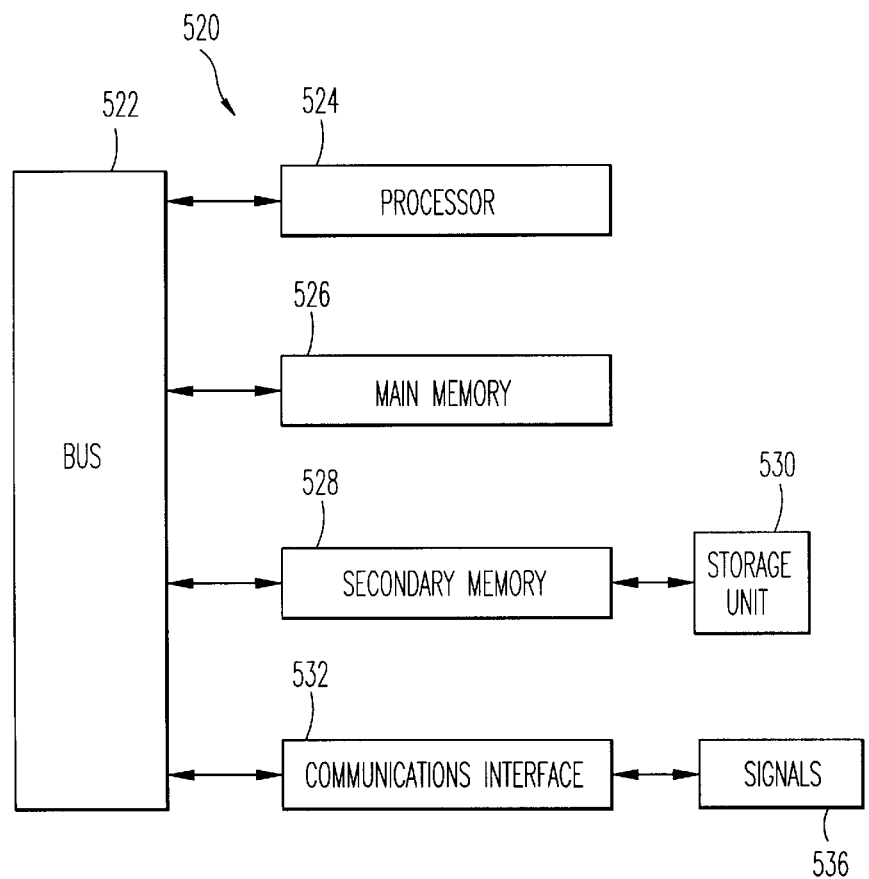
FIG. 4b illustrates an exemplary portion of a generalized hardware configuration, in the format of a workstation, upon which portions of the invention may be implemented.

FIG. 4b illustrates an exemplary hardware configuration of a generalized computer system 520 upon which portions of the invention may be implemented. One or more processors 524 are connected to a communication bus 522. The communication bus 522 also communicates with a main memory 526, preferably a random access memory ("RAM"). A secondary memory 528 communicating with the communication bus 522 may also be included in the computer system 520. The secondary memory 520 may include, for example, a hard disk drive, a removable storage drive such as a floppy disk drive, a magnetic tape drive, an optical disk drive, a program cartridge and cartridge interface, a removable memory chip (e.g., EPROM, PROM, ROM), or any other similar storage medium. The secondary memory 528 may be in communication with a storage unit 530 such as a floppy disk, magnetic tape, optical disk, or other storage medium read by and written to by a secondary memory device. The storage unit 530 includes a computer usable storage medium for storing computer software and data.

The computer system 520 may also include a communications interface 532 in communication with the communication bus 522 for transferring software and data between the computer system 520 and external devices. Examples of communications interfaces 532 include a modem, a network interface (e.g., a network card), a communications port, a PCMCIA slot and card, and other similar interfaces. Software and data transferred via the communications interface 532 are in the form of signals 536 which are provided to the communications interface 532 via a channel 534. The signals 536 may be electronic, electromagnetic, optical or other signals capable of being received by the communications interface 532. The channel 534 may be implemented using wire, cable, fiber optics, a phone line a cellular phone link, an RF link or other communications channels.

Computer programs are stored in main memory 526 and/or secondary memory 528. Computer programs may be received via the communications interface 532. Computer programs, when executed by the processor 524, enable the computer system 520 to perform the features of the present invention.

This invention may be conveniently implemented using a network of conventional general purpose digital computers and/or microprocessors programmed according to the teachings of the present specification, as will be apparent to those skilled in the computer art from reading the above descriptions regarding FIGS. 1–4b. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or a plurality of networked computers to perform a process ol the invention. The storage medium can include, but is not limited to, any type of disk including floppy disks, optical discs, CDROMs, and magneto-optical disks, ROMs, RAMs, EPROMs, EEPROMs, magnetic or optical cards or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

This application is based on Japanese patent application 8-188553 filed in the Japanese Patent Office on Jun. 28,1996 the entire contents of which are hereby incorporated by reference.

What is claimed as new and desired to be secured by Letters Patent of the United States is:

1. An image forming apparatus capable of receiving data in high speed in accordance with high speed data transmission interface comprising:

DMA transmission means for receiving parallel data from a host system according to DMA transmission;

bi-directional communication means for bi-directional communicating with a host system;

flag means for indicating a status of said receiving parallel data from a host system according to DMA transmission is executed or not by said DMA transmission means;

control means for controlling executing of said bi-directional communication by said bi-directional communication means that when said flag means indicates said receiving parallel data from a host system according to DMA transmission is executed, a signal of availability of bi-directional communication is sent to said host system after said receiving parallel data from a host system according to DMA transmission is suspended, when said flag means indicates said receiving parallel data from a host system according to DMA transmission is not executed, a signal of availability of bi-directional communication is sent to said host system immediately.

2. An image forming apparatus according to claim 1, wherein said control means controls that said receiving parallel data from a host system according to DMA transmission is resumed after finishing said bi-directional communication which is executed after receiving parallel data from a host system according to DMA transmission is suspended.

3. An image forming apparatus capable of receiving data in high speed in accordance with high speed data transmission interface comprising:

DMA transmission unit that receives parallel data from a host system according to DMA transmission;

bi-directional communication unit that executes bi-directional communication with a host system;

flag function that indicates a status of said receiving parallel data from a host system according to DMA transmission is executed or not by said DMA transmission unit;

control unit that controls executing of said bi-directional communication by said bi-directional communication unit that when said flag function indicates said receiving parallel data from a host system according to DMA transmission is executed, a signal of availability of bi-directional communication is sent to said host system after said receiving parallel data from a host system according to DMA transmission is suspended, when said flag function indicates said receiving parallel data from a host system according to DMA transmission is not executed, a signal of availability of bi-directional communication is sent to said host system immediately.

4. An image forming apparatus according to claim 3, wherein said control unit controls that said receiving parallel data from a host system according to DMA transmission is resumed after finishing said bi-directional communication which is executed after receiving parallel data from a host system according to DMA transmission is suspended.

5. A method for providing high speed data transmission comprising the steps of:

transmitting DMA parallel data from a host system to a controller;

performing bidirectional communication with said host system;

indicating a status of said parallel data according to whether or not DMA transmission is being executed;

controlling execution of said bidirectional communication wherein when DMA transmission is being executed, a signal of availability ol bi-directional communication is sent to said host system after said parallel data from a host system sent during DMA transmission is suspended and, when said receiving parallel data from a host system is not executed according to DMA transmission, a signal of availability of bi-directional communication is immediately sent to said host system.

6. A computer program product, comprising:

a computer storage medium a computer program code mechanism embedded in the computer storage medium for controlling high speed data transmission between a host system and an image forming device, the computer program code mechanism comprising:
  a first computer code device configured to input DMA transmission status of said received data;
  a second computer code device configured to process bidirectional communication from said host system;
  a third computer code device configured to indicate a status of said received parallel data from said host system according to whether or not DMA transmission is executed;
  a fourth computer code device configured to control execution of said bi-directional communication wherein when said third computer code device indicate that said received data from said host system is executed according to DMA transmission, a signal of availability of bidirectional communication is sent to said host system after receiving said data from said host system according to DMA transmission is suspended and wherein when said third computer code device indicates that said received data from a host system is not executed according to DMA transmission, a signal of availability of bi-directional communication is immediately sent to said host system.

* * * * *